US012685408B2

(12) United States Patent
Brech

(10) Patent No.: US 12,685,408 B2
(45) Date of Patent: Jul. 21, 2026

(54) FOOD PROCESSOR AND EXTRACTOR MODULE

(71) Applicant: Vorwerk & Co. Interholding GmbH, Wuppertal (DE)

(72) Inventor: Oliver Brech, Selm (DE)

(73) Assignee: Vorwerk & Co. Interholding GmbH (DE)

( * ) Notice: Subject to any disclaimer, the term of this patent is extended or adjusted under 35 U.S.C. 154(b) by 415 days.

(21) Appl. No.: 18/136,847

(22) Filed: Apr. 19, 2023

(65) Prior Publication Data

US 2023/0337862 A1 Oct. 26, 2023

(30) Foreign Application Priority Data

Apr. 20, 2022 (EP) ..................................... 22168940

(51) Int. Cl.
*A47J 43/08* (2006.01)
*A47J 36/06* (2006.01)
*A47J 36/38* (2006.01)

(52) U.S. Cl.
CPC .............. *A47J 43/085* (2013.01); *A47J 36/06* (2013.01); *A47J 36/38* (2013.01)

(58) Field of Classification Search
CPC .......... A47J 43/085; A47J 36/06; A47J 36/38; A47J 43/046; A47J 27/00; A47J 36/32; A47J 43/07; F24C 15/20; F24C 15/2021; F24C 15/2035; F24C 15/2057
See application file for complete search history.

(56) References Cited

U.S. PATENT DOCUMENTS

| | | | | |
|---|---|---|---|---|
| 11,457,768 | B1 * | 10/2022 | Gilmartin | ............. A47J 27/004 |
| 2019/0254481 | A1 * | 8/2019 | Frielinghaus | ....... B01F 35/2117 |
| 2019/0289119 | A1 * | 9/2019 | Colston | .................. G08C 17/02 |
| 2022/0225825 | A1 * | 7/2022 | Ben-David | .......... A47J 27/004 |
| 2022/0273139 | A1 * | 9/2022 | Mahapatra | ......... G05B 13/0265 |
| 2022/0404034 | A1 * | 12/2022 | Shimel | ................. F24C 15/003 |

FOREIGN PATENT DOCUMENTS

| | | |
|---|---|---|
| CN | 114246496 A | 3/2022 |
| DE | 7924997 U1 | 2/1980 |
| EP | 3211325 A1 | 8/2017 |

(Continued)

OTHER PUBLICATIONS

European Search Report for Application No. 22168940.9-1016; dated Oct. 6, 2022, 4 pages.

(Continued)

*Primary Examiner* — Dung H Bui
(74) *Attorney, Agent, or Firm* — Barnes & Thornburg

(57) ABSTRACT

The present disclosure relates to food processors for preparing a food in a food preparation vessel by mixing, chopping and/or heating and to an extractor module for a food processor. A food processor for preparing a food in a food preparation vessel by mixing, chopping and/or heating comprises the food preparation vessel, an intake opening, a filter and a suction device with which fume from a food preparation in the food preparation vessel can be sucked in through the intake opening and conveyed through the filter. In this way, a space-saving and convenient possibility for the extraction of generated fume is created.

10 Claims, 2 Drawing Sheets

(56)        References Cited

FOREIGN PATENT DOCUMENTS

Figures 1, 2:
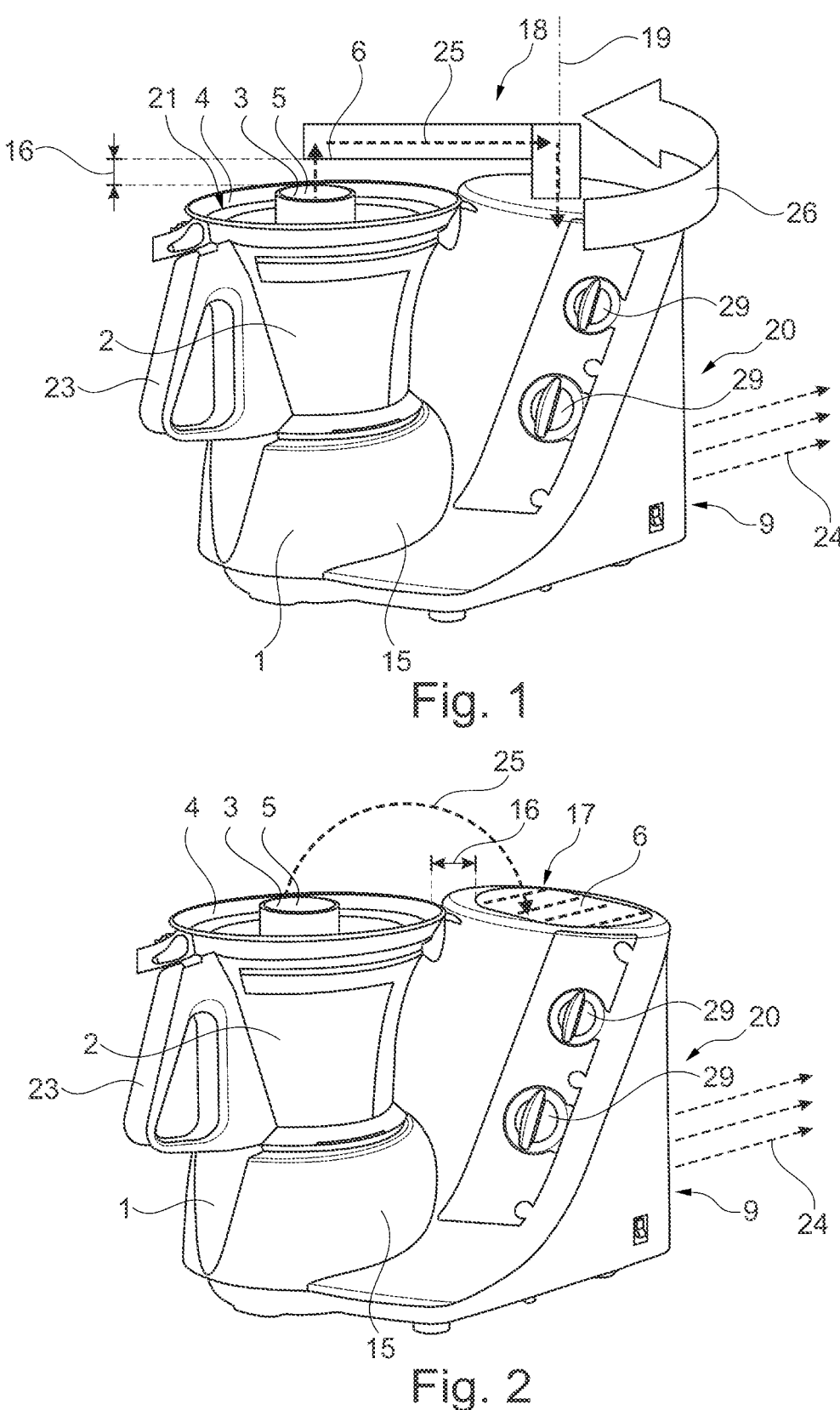

| | | | |
|----|------------|----|---------|
| EP | 3489586 | A1 | 5/2019 |
| EP | 3530161 | A1 | 8/2019 |
| EP | 3799771 | A1 | 4/2021 |
| WO | 2017209534 | A1 | 12/2017 |
| WO | 2018224504 | A1 | 12/2018 |

OTHER PUBLICATIONS

Chinese Office Action for Application No. 202310415733.0, dated Aug. 26, 2025, 7 pages.

* cited by examiner

FOOD PROCESSOR AND EXTRACTOR MODULE

PRIORITY CLAIM

This application claims priority to European Application Serial No. 22168940.9, filed Apr. 20, 2022, which is expressly incorporated by reference herein.

FIELD OF THE DISCLOSURE

The present disclosure relates to food processors for preparing a food in a food preparation vessel by mixing, chopping and/or heating, and to an extractor module for a food processor.

BACKGROUND

During the preparation of food with a food processor, fume is often released. This is particularly the case in cooking processes. Fume refers to air that includes vapor, grease (fat) and/or odors. Such odors are often undesirable, at least in living areas. Moisture contained can also lead to unwanted condensation on kitchen cabinets, for example. Accordingly, there consists a need for filtering the fume generated by food processors.

One solution consists in positioning a food processor on top of a stove to use a conventional range hood (extractor hood) permanently installed above the stove. However, a stove is not a suitable location for a food processor, as there is a risk of damage or fire if there is residual heat from the stove or if a stove top is accidentally turned on. In addition, the stove would then be blocked and thus no longer usable. Also, conventional range hoods require large extraction capacities due to the large distance from the point of origin of the fume, which is associated with noise generation and high energy demand. Devices that extract fume from a lower position downwards are often not usable together with food processors due to their height. Such devices are also not always available.

DE 20 2004 015 441 U1 describes a portable fume extractor device having a housing. The housing has a vertical housing section in which a suction opening is recessed. The fume extractor device can be used together with a food processor. However, this also requires an additional device. In addition, the space requirement of such a system is large, since several devices are needed, which are not necessarily coordinated with each other.

Accordingly, it is the task of the present disclosure to provide a further developed solution to extract and filter fume generated during food preparation, thereby eliminating at least some of the above-mentioned disadvantages.

SUMMARY

A food processor for preparing a food in a food preparation vessel by mixing, chopping and/or heating serves to solve the task of extracting and filtering fume generated during food preparation. The food processor comprises the food preparation vessel, an intake opening, a filter and a suction device with which fume from a food preparation in the food preparation vessel can be sucked in through the intake opening and conveyed through the filter.

In other words, a fume extractor is directly integrated into the food processor. In this way, the fume is extracted and filtered in a space-saving manner. No additional device is necessary. The fume extractor can be optimally adapted to the geometry of the food processor, the food preparation vessel and the fume outlet area. In this way, the geometry of the intake opening and the volume flows to be sucked in and filtered can be optimized. Typically, no additional power connection is required and the extraction of the fume is simple and convenient.

The food processor is particularly configured for boiling or cooking a food in the food preparation vessel. The food preparation vessel is in particular removable. The food processor according to the present disclosure typically comprises a stand part with an insert opening and the food preparation vessel, which can be inserted into the insert opening. All features and parts that are not assigned to the food preparation vessel are accordingly assigned to the stand part.

The food processor comprises an intake opening for sucking the fume into the interior of the housing. The intake opening can be located in the housing or on a separate part. The intake opening represents the beginning of a flow channel through which the sucked-in fume is conveyed. The flow channel can be straight or curved. The flow channel may comprise or be produced from plastic and/or metal. The intake opening and/or an outlet opening may be protected from being reached through by a grid or screen. The grid or screen may consist of plastic or metal. A largest opening or mesh size of the grid or screen may be smaller than 2 cm, in particular smaller than 1 cm and preferably smaller than 0.5 cm. In particular, a grid or screen has identical openings and/or a uniform arrangement of openings. Such a grid or screen is not a filter in the sense of the present disclosure.

The filter serves for removing substances from the fume. A filter is a device that retains constituents from a fume flow as the fume passes (flows) through the filter. In particular, the filter may retain grease, oil, odors, vapor, and/or water droplets. The filter may comprise one or more filter units for removing substances. Filter units may be arranged in series as viewed in the direction of flow. Fume may then pass through a first filter unit, then a second, and so on. Filter units of a filter can be different. There may be a filter unit for retaining grease and/or oil. Supplementary or alternatively, a filter unit for retaining odors may be present. A filter unit for retaining odors may include activated carbon. Supplementary or alternatively, a filter unit for retaining vapor (steam) and/or water droplets may be present, for example a condensate separator. In this way, condensation of water, for example on kitchen cabinets, is prevented. In particular, the filter is attached in the interior of the food processor. The attachment can be made at several points of the filter. The filter may have a suction area for sucking in the fume and an outlet area for filtered fume. The filter may be located in the area of the intake opening, in the area of the outlet opening, or between these positions. In particular, the filter is arranged in a lower and/or rear area of the food processor.

The suction device can generate an air flow or fume flow. In this way, generated fume can be sucked in through the intake opening and conveyed through the filter. The suction device may be a fan and/or comprise an impeller driven by a motor. The impeller may be a wheel with blades attached to it. The fume flow is generated by rotating the impeller. An axis of rotation of the impeller extends, in particular, at an angle of less than 30° to an adjacent region of the flow channel through which the sucked-in fume is conveyed. The motor may be an electric motor. The suction device may comprise a regulating unit with which the speed of the electric motor can be regulated (controlled). In this way, the sucked-in volume flow can be influenced. The suction device can be arranged upstream of one or more filters and/or filter units and/or downstream of one or more filters and/or filter units. The suction device may convey the flow of sucked-in fume by sucking and/or by pushing.

In the following, exemplary embodiments of the disclosure are also explained in more detail with reference to figures. Features of the exemplary embodiments may be combined individually or in a plurality with the claimed subject matter, unless otherwise indicated. The claimed scopes of protection are not limited to the exemplary embodiments.

BRIEF DESCRIPTIONS OF THE DRAWINGS

Figure 3:
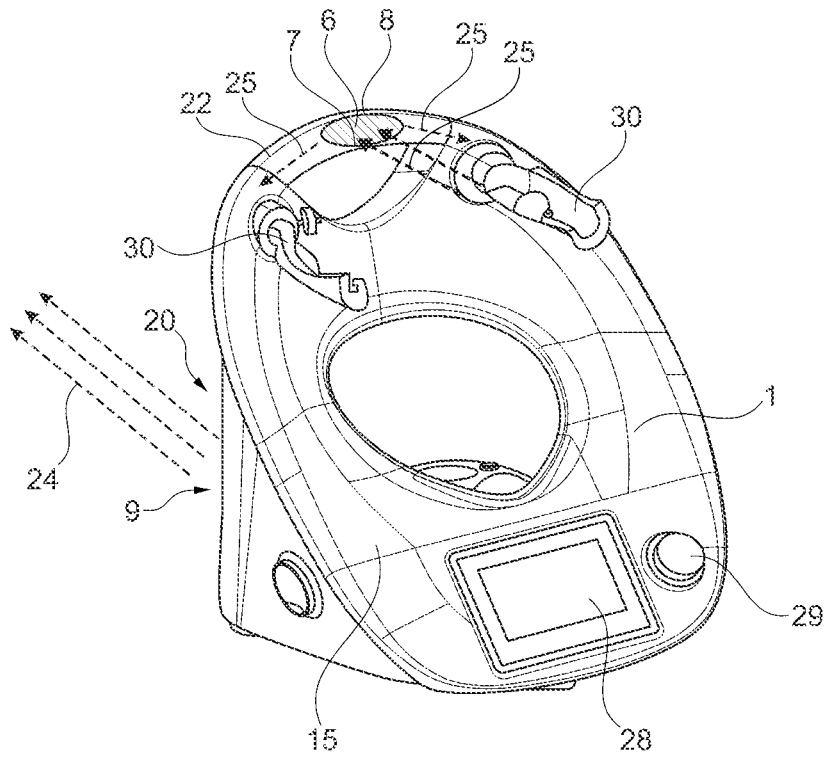

The figures show:

FIG. 1: an embodiment of a food processor,

FIG. 2: a further embodiment of a food processor,

FIG. 3: a stand part of a food processor, and

Figure 4:
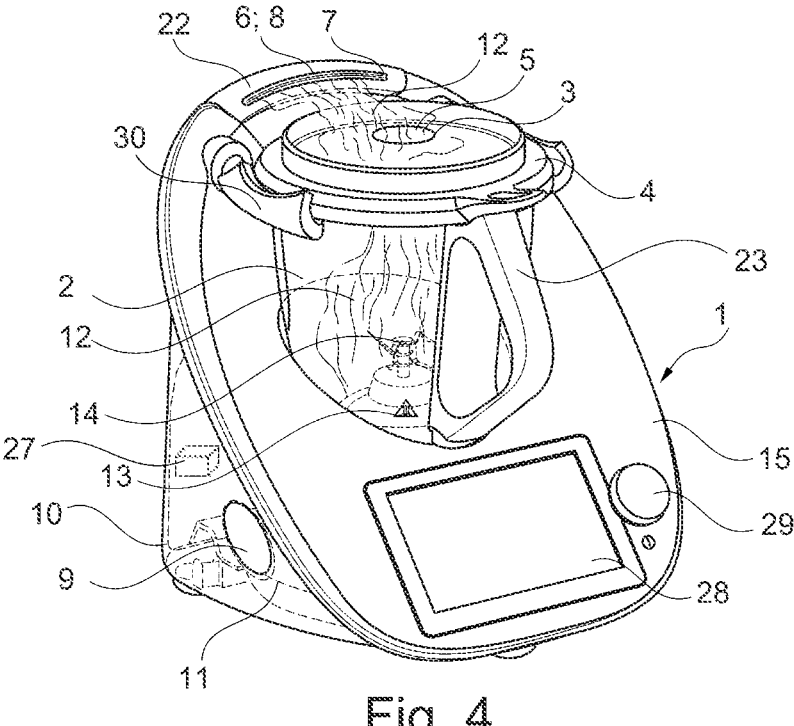

FIG. 4: a further embodiment of a food processor.

DETAILED DESCRIPTION

FIG. 1 shows a food processor 1 according to the present disclosure with a stand part in which a food preparation vessel 2 is inserted. The food processor 1 has several operating elements in the form of rotary switches 29, via which a tool located in the interior of the food preparation vessel 2 and/or a heating element located in the bottom of the food preparation vessel 2 can be controlled. Furthermore, the food processor 1 comprises in the interior of its housing 15 a filter and a suction device, with which fume from a food preparation in the food preparation vessel 2 can be sucked in and conveyed through the filter. On the rear side 20 of the housing there is an outlet opening 9 through which the filtered fume 24 can flow out of the food processor 1.

The food preparation vessel 2 is a pot open at the top with a handle 23. The upper opening 21 may be closed to a large extent by a lid 4. Only in the center of the lid 4 there may be a circular opening 5 with a diameter between 3 cm and 8 cm, through which ingredients can also be added during food preparation. Consequently, fume generated during food preparation passes through the opening 5 in the lid 4 to the outside if the upper opening has been closed by the lid 4. In this configuration, the opening 5 is the fume outlet opening 3. If there is no lid 4, the upper opening 21 is the fume outlet opening.

The food processor 1 further comprises a schematically illustrated suction port 18, which is pivotally attached at its first end to a cover surface 17 of the housing 15 of the food processor 1. The free second end of the suction port 18 has at its periphery and/or end face the intake opening 6, through which the generated fume can be sucked in. The resulting flow is shown with the reference sign 25. The suction port 18 displaces the intake opening 6 into the immediate vicinity of the fume outlet opening 3. The distance 16 between the intake opening 6 and the fume outlet opening 3 may be between 3 cm and 8 cm in this and other configurations.

The suction port 18 is mounted to pivot about the axis of rotation 19. In this way, it can be pivoted laterally out of the suction position shown into a rest position, in order in this way to uncover the opening 5 in the lid 4 and/or the opening 21 of the food preparation vessel 2. In the rest position, the food preparation vessel 2 can in particular also be removed from the stand part by means of the handle 23. An arrow 26 represents the pivoting movement.

Another configuration of a food processor 1 is shown in FIG. 2. In order to avoid duplication, only the differences from FIG. 1 are discussed and otherwise reference is made to the above. In the food processor 1 shown here, there is no suction port on the cover surface 17, but the intake opening 6. In this way, the generated fume is sucked from the fume outlet opening 3 directly into the interior of the housing 15, for example along the flow 25.

FIG. 3 shows a part of a further configuration of a food processor 1. Only the stand part of a food processor 1 is shown without an inserted food preparation vessel 2. The food processor 1 has a carrying handle 22 with which the stand part can be lifted. The carrying handle 22 is located on the upper side of the stand part and approximately at the level of an upper edge of the food preparation vessel. In the carrying handle 22, the intake opening 6 is located which has an elliptical shape, for example. In this way, the suction of the fume can take place by means of existing parts and only over short distances, which enables a particularly effective and efficient suction. For example, the flow marked with the reference sign 25 is established. After entering the carrying handle 22, this flow runs on one or both sides in the interior of the carrying handle 22 into the lower part of the housing 15 of the food processor 1, in which the filter and the suction device are located. An outlet opening 9 is located at the rear side 20 of the food processor 1, through which the filtered fume 24 is delivered in the form of a directed jet.

The food processor 1 shown here further comprises a display 28, a rotary switch 29, and arms 30, which will be discussed below with reference to FIG. 4.

FIG. 4 shows a food processor 1 with a food preparation vessel 2. A lid 4 is placed on the food preparation vessel 2. The lid 4 for the food preparation vessel 2 is locked by arms 30. The lid 4 is located between the two arms 30. The arms 30 can be rotated back and forth about their longitudinal axis between an open position and a locked position by a motor of the food processor. The lid 4 has pressed down and thus released a sensor, namely a rocker arm of an electric switch. The arms 30 and the rocker arm are attached to the stand part of the food processor 1. The food preparation vessel 2 is inserted into the stand part and can be removed from the stand part. In order to be able to remove the food preparation vessel 2, it comprises a handle 23.

A rotatable tool 14 that can be driven by a motor is located in the food preparation vessel 2. The motor is located in the stand part 12. In the bottom of the food preparation vessel 2 there is a heating device 13, which can be electrically connected to the stand part 12 for heating. The motor for rotating the arms 10 is also arranged in the stand part.

The food processor, in particular the stand part, comprises a touch-sensitive display 28 and a rotary switch 29 for operation. The rotary switch 29 can be rotated and pressed. The display 28 and rotary switch 29 are thus operating elements of the food processor 1. Data can be entered via the operating elements 28 and 29. The lid 4 comprises an opening 5 in the center which can be closed with a closure which is not shown, for example a vessel-like closure.

In the stand part there is a control 27 with which the tool 14, the heating device 13 and the suction device 11 can be controlled. In particular, a radio unit is located in the stand part 12, via which data can be sent and received wirelessly. The radio unit can send and receive data via Bluetooth and/or Wi-Fi, for example. For example, the control 27 can access an externally electronically stored recipe via the wireless unit. The control 27 can control the preparation of a food by means of the recipe. The control 27 may receive data from the suction device 11 and, in particular, exchange data with it. Alternatively or additionally, recipes may also be stored in a memory unit of the food processor. The control 27 may control the operation of the suction device.

The food processor 1 includes a filter 10 in the interior of the housing 15. The filter 10 or a filter unit of the filter 10 may be replaceable and accessible from the outside so that it can be cleaned or replaced, for example, during or before a decrease in the filter capacity. The filter 10 or a filter unit of the filter 10 may be configured to be cleaned.

Fume 12 generated during the preparation of food is initially located in the food preparation vessel 2. It escapes upwards through the opening 21 of the food preparation vessel and in particular through the opening 5 of the lid 4, which in the present exemplary embodiment represents the fume outlet opening 3. The intake opening 6 is located in the carrying handle 22 in the configuration shown here. The escaping fume 12 is sucked in through the intake opening 6. In the embodiment shown here, the intake opening 6 is slot-shaped and follows the curved contour of the carrying handle 22. The distance between the intake opening 6 and the food preparation vessel 2 is less than 10 cm. A lowest position 7 of the intake opening 6 is located less than 5 cm above the fume outlet opening 3. A highest position of the intake opening 6 is less than 10 cm above the fume outlet opening 3. In this way, only short distances are necessary to suck in the fume 12.

A grid protects the intake opening 6 and forms part of the outer contour of the carrying handle 22, so that carrying the food processor 1 is possible without restriction despite the presence of the intake opening 6. The sucked-in fume 12 is conveyed by means of the suction device 11 through a flow channel in the interior of the carrying handle and the housing of the food processor 1 to the filter 10 and through the filter 10. The suction device 11 comprises for this purpose a fan (blower), which is driven by an electric motor. This can be the electric motor for driving the tool 14 or a separate electric motor.

The fume 12 thus conveyed flows through the filter 10, is filtered by at least one filter unit of the filter 10, for example by a filter material located in a filter unit, and flows out of the filter device again through the outlet opening 9. The outlet opening 9 is located in a rear side wall of the food processor 1. The food processor 1 may comprise, as a filter unit of the filter 10, a device for separating water, which may comprise a cooling element for cooling the fume for the purpose of condensing the contained water.

In one embodiment, the food processor comprises a heating device for heating a food in the food preparation vessel and/or a tool for mixing or chopping the food in the food preparation vessel.

The heating device can be arranged at and/or in the bottom of the food preparation vessel. In particular, an electrical heating device is meant. Preferably, a rotatable tool serves for chopping and/or mixing, which is arranged or can be arranged in particular in the bottom area of the food preparation vessel. The tool and the heating device are electrically operable and serve for preparing a food in the food preparation vessel. The tool may be reversibly connectable to a shaft of the food processor. Preferably, a drive for rotating the tool or the shaft is arranged in a housing of the food processor. In particular, the drive is connected to the tool via a shaft that extends in a sealed manner through an opening in the bottom of the food preparation vessel. Preferably, the tool has at least one blade. Preferably, the tool has one or more radial tool arms, such as stirring arms for mixing, blades for chopping, or knives or mixing knives for mixing and chopping. In particular, the at least one tool arm is fixedly attached to a holder of the tool.

In one embodiment, the food processor comprises a housing, wherein the filter and/or the intake opening are arranged in the housing so that fume can be sucked into the interior of the housing and filtered there. The housing serves to accommodate the filter and/or the suction device. The filter and/or the suction device are in particular at least partially arranged or arrangeable in the housing. Deviating from this, the suction device can also be arranged on the outside of the housing. The housing is a protective cover. The housing can therefore consist of a solid material such as metal and/or plastic. The intake opening can be located in the housing. The intake opening represents the beginning of a flow channel that extends through the housing, at least in sections.

In one embodiment, a lowest position of the intake opening is less than 5 cm below a fume outlet opening of the food preparation vessel. Preferably, the lowest position of the intake opening is at the level of the fume outlet opening or higher. The fume outlet opening can be, for example, an opening of the food preparation vessel, in particular located at the top, or an opening in a lid of the food preparation vessel. In other words, the intake opening is designed and arranged such that fume to be filtered is extracted substantially horizontally and/or obliquely upwards. In this way, the energy required for the suction is reduced. The height and associated features are principally measured in the vertical direction on a food preparation device set up as intended.

In one embodiment, a highest position of the intake opening is less than 20 cm, preferably less than 10 cm above a fume outlet opening of the food preparation vessel. In other words, the intake opening is designed and arranged such that a flow path of the fume to be filtered between the food preparation vessel and the intake opening is minimized. In this way, an unnecessarily high food processor is avoided. In addition, the energy required for extraction is reduced.

In one embodiment, a distance between the intake opening and the food preparation vessel is less than 20 cm, in particular less than 10 cm. The distance means the shortest clear width between the food preparation vessel, possibly with a lid attached, and the intake opening, for example a grid covering the intake opening. The distance between these points is small, so that any fume produced can be extracted particularly effectively and efficiently. In addition, the solution according to the present disclosure is particularly space-saving. In particular, the distance is greater than 1 cm.

In one embodiment, the food processor can access an electronically stored recipe and control the suction device depending on the electronically stored recipe. The food processor may be configured such that it can prepare a food in an at least partially automated manner by means of the recipe. The food processor may include a control that can access an electronic recipe and can be caused by a recipe step of the recipe to operate the tool, the heating device, and/or the suction device in a manner defined by the recipe step. The electronic recipe may be stored in the food processor or externally. In particular, a digital recipe is meant.

The recipe may comprise control commands for the tool, the heating device and/or the suction device. The suction device may be set to operate in the manner specified by the recipe during preparation of a food. The setting may be done in an automated manner or manually. The recipe may include multiple recipe steps, such as chopping ingredients and sautéing the chopped ingredients. The recipe may comprise several control commands for the suction device, so that, for example, no suction or suction of only a small volume flow is performed during chopping, and a large or maximum volume flow is sucked in during sautéing. In this way, suction can be performed which is automatically adjusted optimally to the respective step of food preparation.

In particular, the food processor comprises a control configured to control the suction device as well as the tool and/or the heating device. In particular, the control is configured such that the control controls the suction device based on information relating to a food preparation process. The information may be or may be derived from a control command for the tool or the heating device. The information may come from a sensor, such as a temperature sensor in the food preparation vessel. For example, at high temperatures, a large volume flow can be conveyed to selectively filter fume containing vapor as completely as possible.

A control in the sense of the present disclosure typically comprises a data processing device by means of which data can be processed electronically. A control in the sense of the present disclosure may comprise an electronic memory in which data can be stored. An interface for transferring data from and/or to a remote device may be connected with the control.

In one embodiment, the food processor comprises an upwardly facing cover surface (top surface) and the intake opening is disposed in the cover surface. The cover surface may be oriented substantially horizontally or obliquely. In particular, the cover surface defines at least a portion of an upper side of the food processor. A cover surface may be located approximately at the level of the upper edge of the food preparation vessel. In particular, the intake opening and/or a grid covering the intake opening fits smoothly into the contour of the cover surface.

In one embodiment, the food processor comprises a carrying handle for carrying the food processor. The intake opening is arranged in the carrying handle. This is particularly advantageous when the handle is located near a fume outlet area of the food processor. The handle can be a handle of a stand part of a food processor.

The carrying handle can be tubular. The flow channel can run from the intake opening through the carrying handle. According to this embodiment, suction can be integrated into an existing construction particularly easily.

In one embodiment, the food processor has a suction port that provides the intake opening. In particular, the suction port is arranged movably in such a way that it can selectively uncover (release) an opening on the upper side of the food preparation vessel. The suction port serves to suck off the fume even closer to the point of origin and to guide it, for example, to the housing of the food processor. The intake opening can thus be positioned closer to an opening in a lid of the food preparation vessel instead of, for example, a position in a housing of the food processor. In this way, the suction can be performed even more efficiently and with less noise.

A suction port is a conduit element for sucking in fume and can be designed, for example, as a tube. The suction port does not necessarily have to be closed, but can have openings. In one configuration, the suction port can be detachably attached to a housing of the food processor. In this way, cleaning can be performed particularly easily. In particular, a first end of the suction port is attached or attachable to a housing of the food processor. In particular, the intake opening is located at a second end of the suction port opposite the first end. The intake opening can be arranged on the front side and/or on the side.

In one embodiment, the suction port is rotatably mounted about an axis of rotation. In particular, the axis of rotation is oriented substantially vertically. The suction port can be pivoted from a suction position to a rest position and back.

In the suction position, the intake opening is located above an opening in the food preparation vessel. In the rest position, the intake opening is not or at least not centrally located above the opening. In this way, the opening of the food preparation vessel or the opening in the lid of the food preparation vessel can be released at least partially and in particular completely, so that, for example, an ingredient can be added or seasoning can be performed. Also, the food preparation vessel can be released in this way in order to remove it, for example after completion of a food preparation. The suction port can be rotated manually or by means of a drive which is in particular electric.

In one embodiment, the food processor comprises a lid for the food preparation vessel. The lid may have an opening. The opening is in particular circular. The opening is in particular central. The lid serves to close the opening of the food preparation vessel in such a way that it is not possible to reach into it by hand. The lid can be locked onto the food preparation vessel. A control of the food processor can be configured such that operation of the tool and/or the heating device is only possible when the lid is locked on the food preparation vessel. The opening allows to add ingredients during food preparation. In particular during cooking processes, fume can then escape through the opening.

In one embodiment, the filter can be cleaned. At least one filter unit of the filter can be cleaned. In this way, for example, a reduced filter performance can be restored. For example, rinsing of the filter is possible, in particular backwashing, to remove contaminants from the filter in this way. Rinsing can be carried out, for example, with air or water or a cleaning solution. The cleaning of the filter can take place in the interior of the food processor. In one configuration, the filter is accessible from the outside to allow removal of the filter for cleaning.

In one configuration, the filter and/or a filter unit can be removed to replace it with a filter or filter unit that is as good as new. In particular, this may be the case if the filter and/or filter unit includes an adsorbent, such as activated carbon, for removing odors. The replacement can then provide fresh adsorbent and restore the filter capacity. However, replacing a filter or filter unit may also be useful for filters that act purely mechanically.

In one embodiment, the food processor has an outlet opening for filtered fume. The filtered fume can be delivered (dispensed) through the outlet opening, e.g. leave the housing. The outlet opening can be designed in such a way that the fume is discharged in a directed manner.

In particular, the outlet opening is arranged on a rear side, i.e. a rear area, of the food preparation vessel. In this way, a possibly undesired outflow in the direction of the user is avoided. The outlet opening can also be arranged on a side surface of the housing.

In one configuration, the food processor comprises an electric motor for driving the tool, which is also configured to drive the suction device. The electric motor is thus configured for both functions. In particular, the suction device and the tool can be used independently of each other. An appropriately configured gearbox may be provided. The power supply of the electric motor and the power supply of the motor of the suction device, and in particular also the power supply of the heating device, can be coupled in such a way that a single plug is sufficient for both functions.

In one configuration, the food processor comprises as a filter or as a filter unit of the filter a device for separating water from the fume. In particular, the food processor comprises a collection tank for collecting the separated water. Alternatively, a drain may be provided through which separated water may drain. In particular, the device for separating water comprises a cooling element for cooling the fume for the purpose of condensing the water. The cooling element serves to cool a surface in contact with the fume. Water can thus condense on the surface. In particular, the cooling element used is an active cooling element such as a Peltier element. In particular, the food processor may be configured such that the condensed water flows into the collection tank by gravity. For this purpose, a suitably aligned channel for draining the water vapor is arranged between the cooled surface and the tank. The channel may be part of a flow channel for fume through the food processor. Thus, fume in the flow channel may be cooled by the cooling element so that included water condenses. The filter device is preferably arranged downstream of the coolable surface. The service life can be increased in this way. Alternatively, the filter device can also be arranged downstream of the coolable surface. In particular, the collection tank is removable so that it can be easily emptied. This embodiment allows for the output of exhaust air with a low water content. This is advantageous for furniture such as kitchen cabinets where moisture can cause damage.

A further aspect of the disclosure is a food processor for preparing a food in a food preparation vessel by mixing, chopping and/or heating. The food processor comprises the food preparation vessel and a heating device for heating a food in the food preparation vessel and/or a tool for mixing or chopping the food in the food preparation vessel. The food processor further comprises a receiving area configured to receive an extractor module. The extractor module to be received comprises a filter and a suction device by means of which fume from a food preparation in the food preparation vessel can be sucked through the filter. This aspect provides a modular food processor that can be equipped with a separately available extractor module, if required. All features, configurations and effects of the food processor described at the beginning also apply to this food processor and vice versa.

The receiving area is a location where an extractor module can be arranged to be operated there. Typically, the receiving area is located in the interior of the food processor. The receiving area may be a cavity. In particular, the food processor comprises a housing and the receiving area is located within the housing. The food processor may include a delivery port through which a fume flow to be filtered is delivered to flow into an inlet area of the extractor module. Alternatively, the fume flow may be sucked directly into the extractor module. The food processor may include a receiving port through which a filtered fume flow may flow into the food processor from an outlet area of the extractor module. Alternatively, the filtered fume flow may flow directly out of the extractor module into the environment.

The food processor may have an intake opening and/or an outlet opening through which fume can be sucked in or discharged when the extractor module is placed in the receiving area. The intake opening and/or the outlet opening can be covered by a cladding element in order to close accesses through the housing when the extractor module is not placed in the receiving area. Alternatively, the intake opening and/or the outlet opening may be produced only in the course of installing the extractor module.

A further aspect of the disclosure is an extractor module for a food processor. The extractor module comprises an inlet area, a filter, a suction device and an outlet area. By means of the suction device, fume from a food preparation can be sucked in through the inlet area and conveyed through the filter and the outlet area. The extractor module is configured to be received in a receiving area of a food processor.

The inlet area serves for the inflow of the fume to be filtered into the extractor module. The outlet area serves for discharging the filtered fume from the extractor module. The inlet area may provide the inlet opening when the extractor module is placed in the receiving area. The outlet area may provide the outlet opening when the extractor module is placed in the receiving area. The inlet opening and/or the outlet opening may alternatively be provided by the food processor. In particular, when the extractor module is placed in the receiving area, the food processor is configured analogously to the first aspect of the disclosure mentioned above. Accordingly, all features, configurations and effects of the food processors described at the beginning also apply to the extractor module and vice versa.

In particular, the extractor module comprises a housing that can be positioned and, if necessary, attached in a receiving area provided for this purpose in a food preparation device. This can be done by an end user. For example, the food processor has a cover that closes the receiving area when the extractor module is not placed in the receiving area. This can be removed or moved to a different position to place the extractor module. The cover can then be brought back into position for covering.

The extractor module can be of one-piece or multi-piece design. In the case of a one-piece design, in particular, all components of the extractor module are arranged in a housing of the extractor module. In the case of a multi-piece design, there may be multiple housings, wherein, for example, the filter is arranged in a first housing and the suction device is arranged in a second housing.

A further aspect of the present disclosure is a method of preparing a food using a food processor. The food processor comprises a food preparation vessel, an intake opening, a filter and a suction device and/or is a food processor. A food is prepared in the food preparation vessel, in particular by mixing, chopping and/or heating. At the same time, fume produced during the food preparation is sucked in by the suction device through the intake opening and conveyed through the filter to be filtered in this way. All features, configurations and effects of the food processors described above also apply to the method and vice versa.

The invention claimed is:

1. A food processor for preparing a food in a food preparation vessel by heating as well as mixing and/or chopping, the food processor being a domestic food processor, the food processor comprising a food preparation vessel, the food preparation vessel including a bottom with a through opening, and further including a fume outlet opening, and a removable lid having an opening that can serve as the fume outlet opening in response to the lid covering the fume outlet opening, a rotatable tool configured to at least one of chop and/or mix the food in the food preparation vessel, the rotatable tool being rotatable about a vertical axis, a drive configured to rotate the rotatable tool, the drive being connected to the rotatable tool via a shaft that extends in a sealed manner through the through opening, an intake opening, a filter, a suction device with which fume from a food preparation in the food preparation vessel configured to be sucked in through the intake opening and conveyed through the filter, a heating device for heating a food in the food preparation vessel, a housing, wherein the filter and the intake opening are arranged in the housing so that fume configured to be sucked into the interior of the housing and configured to be filtered there, wherein the food preparation vessel is arranged on the housing, wherein the drive is arranged in the housing, wherein a lowest position of the intake opening is located less than 5 cm below the fume outlet opening of the food preparation vessel or higher, wherein the food processor has an upwardly facing cover surface, the cover surface defining at least a portion of an upper side of the food processor, and the intake opening is arranged in the cover surface, wherein the food processor includes an outlet opening for filtered fume, and wherein the outlet opening is arranged at a rear side of the food processor.

2. The food processor of claim 1, wherein a lowest position of the intake opening is located at the level of the fume outlet opening or higher.

3. The food processor of claim 1, wherein, a highest position of the intake opening is located less than 20 cm above a fume outlet opening of the food preparation vessel.

4. The food processor of claim 3, wherein the food preparation vessel includes a fume outlet opening, and wherein a highest position of the intake opening is located less 10 cm above the fume outlet opening of the food preparation vessel.

5. The food processor of claim 1, wherein a distance between the intake opening and the food preparation vessel is less than 20 cm.

6. The food processor of claim 1, wherein the food processor is able to access an electronically stored recipe and that the food processor controls the suction device in dependence on the electronically stored recipe.

7. The food processor of claim 1, wherein the housing includes a carrying handle for carrying the food processor and the intake opening is arranged in the carrying handle.

8. The food processor of claim 1, wherein the suction port is rotatably mounted about an axis of rotation which is vertical.

9. The food processor of claim 1, wherein the filter configured to be cleaned.

10. A food processor for preparing a food in a food preparation vessel by mixing, chopping and/or heating, the food processor comprising a food preparation vessel, the food preparation vessel including a bottom with a through opening, and further including a fume outlet opening, and a removable lid having an opening that can serve as the fume outlet opening in response to the lid covering the fume outlet opening, a rotatable tool configured to at least one mix or chop the food in the food preparation vessel, the rotatable tool being rotatable about a vertical axis, a drive for rotating the rotatable tool, the drive being connected to the rotatable tool via a shaft that extends in a sealed manner through the through opening, a heating device for heating a food in the food preparation vessel, and a housing, wherein the food preparation vessel is arranged on the housing, wherein the drive is arranged in the housing, a suction port providing an intake opening, wherein the suction port is movable so as to enable uncovering an opening at the upper side of the food preparation vessel, wherein a lowest position of the intake opening is located less than 5 cm below the fume outlet opening of the food preparation vessel or higher, wherein the food processor has an upwardly facing cover surface, the cover surface defining at least a portion of an upper side of the food processor, wherein the food processor includes an outlet opening for filtered fume, wherein the outlet opening is arranged at a rear side of the food processor, and wherein the food processor further comprises a receiving area configured to receive an extractor module, the extractor module comprising a filter and a suction device by means of which fume from a food preparation in the food preparation vessel configured to be sucked through the filter.

* * * * *